(12) United States Patent
Bai

(10) Patent No.: US 12,507,709 B2
(45) Date of Patent: Dec. 30, 2025

(54) SLUSH MACHINE

(71) Applicant: Lu Bai, Qingdao (CN)

(72) Inventor: Lu Bai, Qingdao (CN)

( * ) Notice: Subject to any disclaimer, the term of this patent is extended or adjusted under 35 U.S.C. 154(b) by 0 days.

(21) Appl. No.: 19/260,382

(22) Filed: Jul. 4, 2025

(65) Prior Publication Data

US 2025/0331534 A1 Oct. 30, 2025

(30) Foreign Application Priority Data

Jul. 1, 2025 (CN) .......................... 202521373162.X

(51) Int. Cl.
*A23G 9/04* (2006.01)
*A23G 9/10* (2006.01)

(52) U.S. Cl.
CPC ............. *A23G 9/045* (2013.01); *A23G 9/106* (2013.01)

(58) Field of Classification Search
CPC .......... A23G 9/045; A23G 9/106; A23G 9/22; A23G 9/224; A23G 9/281; A23G 9/222; A23G 9/225; A23G 2220/10; B01F 25/431973; B01F 25/431971
See application file for complete search history.

(56) References Cited

U.S. PATENT DOCUMENTS

| | | | | |
|---|---|---|---|---|
| 2012/0240611 A1* | 9/2012 | Grampassi | ............. | A23G 9/281 |
| | | | | 62/342 |
| 2025/0234887 A1* | 7/2025 | Roberts | .................. | A23G 9/281 |
| 2025/0234893 A1* | 7/2025 | Lerman | .................... | A23G 9/22 |

FOREIGN PATENT DOCUMENTS

| | | | | | |
|---|---|---|---|---|---|
| CN | 2804702 Y | * | 8/2006 | | |
| CN | 103228152 A | * | 7/2013 | ............. | A23G 9/045 |
| CN | 108671823 A | * | 10/2018 | ........ | B01F 35/32005 |
| CN | 209089082 U | * | 7/2019 | | |
| CN | 118924113 A | * | 11/2024 | ............. | B01F 35/50 |

* cited by examiner

*Primary Examiner* — Frantz F Jules
*Assistant Examiner* — Martha Tadesse
(74) *Attorney, Agent, or Firm* — Daniel M. Cohn; Howard M. Cohn

(57) ABSTRACT

The present disclosure belongs to the technical field of refrigeration equipment, and in particular to a slush machine, comprising a material tank of which two sides are provided with a support bracket, respectively; an agitator component including a body upper shell, wherein one side of the body upper shell is provided with an agitator of which one end extends into an interior of the material tank and a driving mechanism for driving the agitator. The present disclosure achieves sliding positioning and precise locking of the material tank using the structure of double support arms, tracks and lock buckles, which improves the assembly accuracy and operation stability.

2 Claims, 11 Drawing Sheets

SLUSH MACHINE

TECHNICAL FIELD

The present disclosure relates to the technical field of refrigeration equipment, and in particular to a slush machine.

BACKGROUND

Frozen beverage machine, which may also be referred to as a semi-frozen beverage machine or crushed ice beverage machine, typically includes a transparent tank or mixing vessel that receives and processes the beverage product. The processing includes cooling, often transforming the beverage product from a pure liquid (or a combination of liquid and ice) into a frozen or semi-frozen product, such as a slush, granita, smoothie, ice cream, or other frozen or semi-frozen product, which is then dispensed. The cooled product is usually dispensed through a tap, spout, or dispenser located near the front and bottom of the container.

In the prior art, slush machines suffer from time-consuming and labor-intensive disassembly and assembly of the material tank, poor assembly stability, concentrated stress leading to component deformation, and cumbersome removal of the drip tray, which adversely affect operation stability and slush quality, resulting in suboptimal performance.

Therefore, a slush machine is provided to solve the above problems.

SUMMARY OF THE APPLICATION

I. Technical Issues Solved

In view of the deficiencies in the prior art, the present disclosure provides a slush machine that solves the problems in the above background that the disassembly and assembly process of the material tank is time-consuming and labor-intensive, the assembly stability is poor, the concentrated force causes the deformation of the components, and the disassemble process of the drip tray is cumbersome.

II. Technical Solutions

The present disclosure specifically adopts the following technical solutions:

A slush machine, comprising:
a material tank of which two sides are provided with a support bracket, respectively;
an agitator component including a body upper shell, wherein one side of the body upper shell is provided with an agitator of which one end extends into an interior of the material tank and a driving mechanism for driving the agitator;
support arms corresponding to the two support brackets are disposed on two sides of the body upper shell, respectively, a transverse track is formed inside the support arm, the support bracket is capable of sliding along the track to position the material tank to a working position;
a refrigeration component, a top of which is detachably connected to a drip tray located below the material tank, the body upper shell being fixedly disposed on the top of the refrigeration component;
a fixed bracket disposed at a bottom of one end of the material tank; wherein a bottom of the fixed bracket contacts the top of the refrigeration component and is configured to transmit an operation load to the refrigeration component.

In some embodiments, the agitator includes a condenser and a three-blade propeller sleeving outside the condenser, the driving mechanism includes a driving motor fixedly mounted inside the body upper shell through a module bracket, one end of an output shaft of the driving motor penetrates through the condenser and is connected and cooperated with one end of the three-blade propeller through a flat key and a keyway, and one end of the condenser is movably sleeved with the output shaft through a sealed bearing.

In some embodiments, the refrigeration component includes a base and a box body disposed on a top of the base, a middle frame is fixedly embedded on a top of the box body, one end of the middle frame is provided with a support groove and a clamping groove located on one side of the support groove, the drip tray is movably disposed inside the middle frame and one end of the drip tray is provided with an elastic buckle clamped with the clamping groove.

In some embodiments, a bottom end of the fixed bracket is movably sleeved inside the support groove, and an interior of the support groove is provided with a reinforcing rib of which one end extends to an interior of the fixed bracket.

In some embodiments, a compressor and a heat exchanger connected to the compressor through a pipeline are disposed on the top of the base, a liquid cooling delivery pipe is disposed on the compressor, one end of the liquid cooling delivery pipe penetrates through the middle frame and the body upper shell and extends to an interior of the condenser, the heat exchanger is mounted on the top of the base through a rear bracket, a cooling fan is disposed on one side of the rear bracket, a wastewater box lower cover is movably disposed at one end of the base, and a wastewater box upper cover is disposed on a top of the wastewater box lower cover.

In some embodiments, the box body includes two base surface covers arranged opposite to each other, a rear cover and a front shell bracket are respectively arranged between two ends of the two base surface covers, a display screen and a control module are disposed on one side of the front shell bracket, and a panel is disposed on the other side of the front shell bracket, a front bracket is disposed on the top of the base, tops of the front bracket and the rear bracket are fixedly connected to a bottom of the middle frame, and a top of the rear cover extends to an interior of one side of the body upper shell.

In some embodiments, a material tank cover is disposed at one end of the material tank, a discharge handle is disposed at the other end of the material tank, a feed cover is disposed on a top of the material tank, a induction column is disposed on one side of the material tank cover, a surface cover is disposed on one side of the body upper shell, an infrared probe corresponding to the induction column is disposed on the surface cover, a material tank sealing ring is disposed on one side of the surface cover, an end of the condenser away from the sealed bearing penetrates through the material tank sealing ring to be fixed to the surface cover, and the material tank cover presses the material tank sealing ring after the material tank is mounted in place.

In some embodiments, the support bracket is in a "straight line shape", positioning pins are disposed on two sides of the material tank, a lock buckle is movably disposed on one side of the support arm, a positioning channel is disposed on one side of the lock buckle, a notch configured to connect the positioning channel and the positioning pin is disposed at one end of the track, and the lock buckles on the two support arms rotate synchronously through a rotating shaft.

III. Beneficial Effects

Compared with the prior art, the present disclosure provides a slush machine, which has the following beneficial effects:

The present disclosure achieves sliding positioning and precise locking of the material tank using the structure of double support arms, tracks and lock buckles, which improves the assembly accuracy and operation stability. The fixed bracket at the bottom of the material tank is embedded in the support groove of the refrigeration component to form a three-dimensional frame, which disperses and transmits the discharge pressure and handling tension to the box body to prevent component deformation, protect the connection structure of the material tank, and prevent stress deformation. The elastic buckle drip tray has a one-hand quick-release design that simplifies the cleaning process. The three-blade propeller is directly connected to the condenser to improve mixing uniformity. The sealed bearing and flat key transmission are used to prevent adhesion and slippage, which ensures that the slush melt has a fine texture and meets user needs, thereby achieving broad application prospects.

REFERENCE SIGNS IN THE FIGURES

Figure 1:
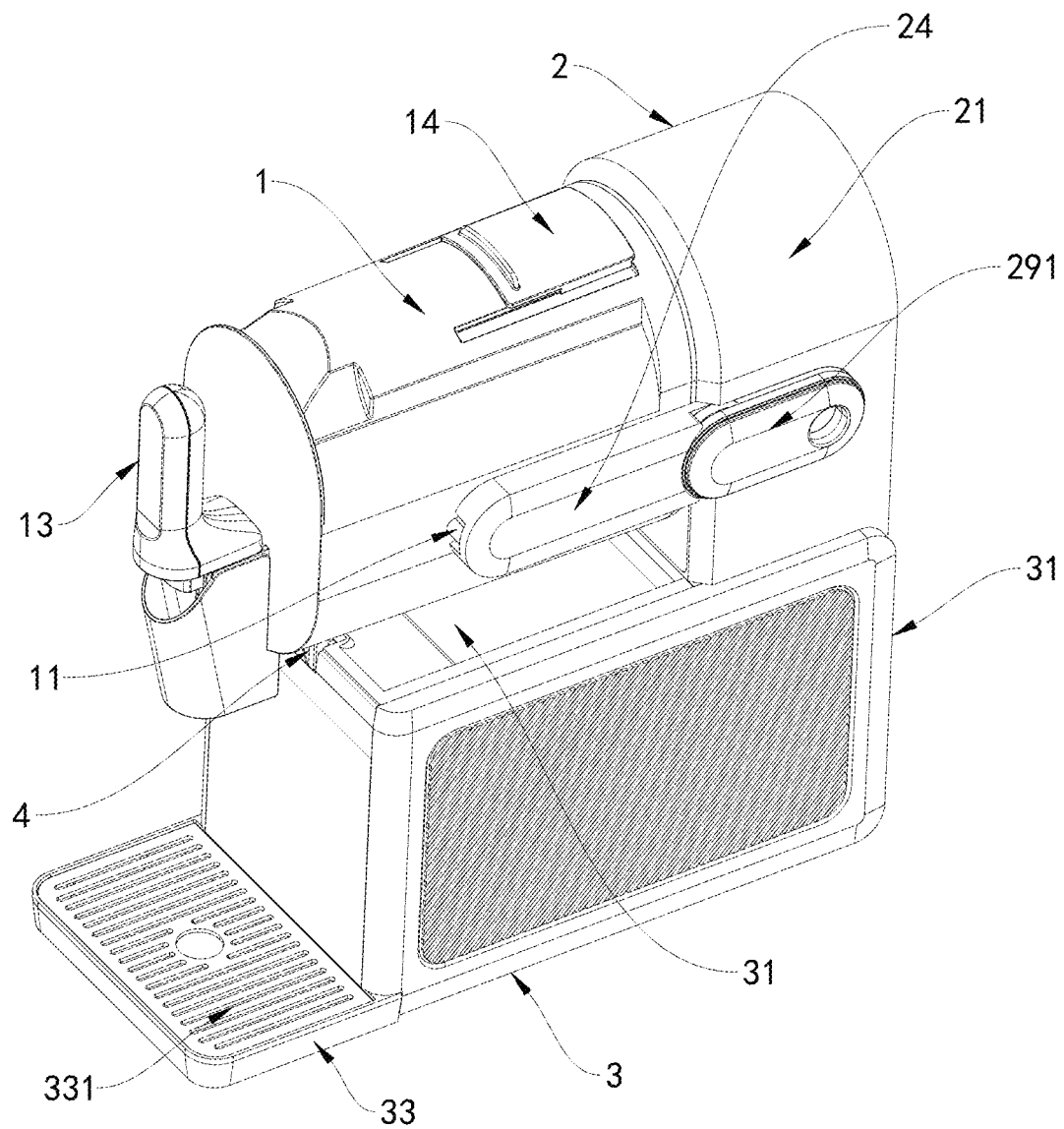
FIG. 1 is a schematic structural diagram of a material tank according to the present disclosure.
Figure 2:
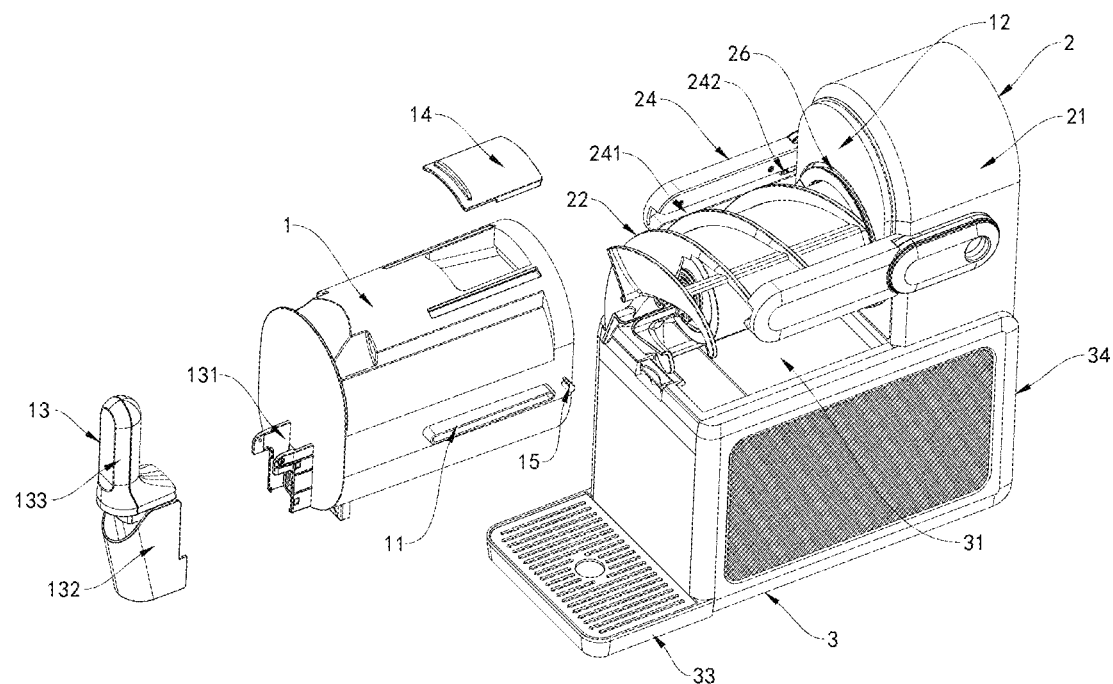
FIG. 2 is a schematic structural diagram of an agitator according to the present disclosure.

1. material tank; 11. support bracket; 12. material tank cover; 121. induction column; 13. discharge handle; 131. support; 132. discharge trough; 133. handle; 134. connecting rod; 135. discharge trough bracket; 136. discharge cover; 137. sealing ring; 14. feed cover; 15. positioning pin; 16. discharge port; 2. agitator component; 21. body upper shell; 211. module bracket; 212. power module; 22. agitator; 221. condenser; 2211. sealed bearing; 222. three-blade propeller; 23. driving mechanism; 231. driving motor; 232. output shaft; 233. flat key; 234. keyway; 24. support arm; 241. track; 242. notch; 25. surface cover; 251. infrared probe; 26. material tank sealing ring; 27. lock buckle; 271. positioning channel; 272. buckle; 28. rotating shaft; 29. lock buckle handle inner shell; 291. lock buckle handle outer shell; 3. refrigeration component; 31. drip tray; 311. elastic buckle; 32. base; 321. front bracket; 33. wastewater box lower cover; 331. wastewater box upper cover; 34. box body; 341. base surface cover; 342. rear cover; 343. front shell bracket; 344. display screen; 345. control module; 346. panel; 35. middle frame; 351. support groove; 352. clamping groove; 353. reinforcing rib; 36. compressor; 361. pipeline; 362. liquid cooling delivery pipe; 37. heat exchanger; 371. rear bracket; 38. cooling fan; 4. fixed bracket.

DETAILED DESCRIPTION

The following will clearly and completely describe the technical solutions in the embodiments of the present disclosure with reference to the drawings in the embodiments of the present disclosure. Obviously, the described embodiments are only part of the embodiments of the present disclosure, not all of the embodiments. Based on the embodiments of the present disclosure, all other embodiments obtained by those having ordinary skills in the art without creative work are within the scope of protection of the present disclosure.

Embodiments

As shown in FIGS. 1-11, a slush machine provided in one embodiment of the present disclosure includes a material tank 1 of which two sides are provided with a support bracket 11, respectively.

An agitator component 2 including a body upper shell 21, wherein one side of the body upper shell 21 is provided with an agitator 22 of which one end extends into an interior of the material tank 1 and a driving mechanism 23 for driving the agitator 22.

Support arms 24 corresponding to the two support brackets 11 are disposed on two sides of the body upper shell 21, respectively, a transverse track 241 is formed inside the support arm 24, the support bracket 11 is capable of sliding along the track 241 to position the material tank 1 to a working position.

A refrigeration component 3, a top of which is detachably connected to a drip tray 31 located below the material tank 1, the body upper shell 21 being fixedly disposed on the top of the refrigeration component 3.

A fixed bracket 4 disposed at a bottom of one end of the material tank 1, wherein a bottom of the fixed bracket 4 contacts the top of the refrigeration component 3 and is configured to transmit an operation load to the refrigeration component 3.

The present disclosure achieves sliding positioning and precise locking of the material tank 1 using the structure of double support arms 24, tracks 241 and lock buckles 27, which improves the assembly accuracy and operation stability. The fixed bracket 4 at the bottom of the material tank 1 is embedded in the support groove 351 of the refrigeration component 3 to form a three-dimensional frame, which disperses and transmits the discharge pressure and handling tension to the box body 34 to prevent component deformation, protect the connection structure of the material tank 1, and prevent stress deformation. The elastic buckle 311 drip tray 31 has a one-hand quick-release design that simplifies the cleaning process. The three-blade propeller 222 is directly connected to the condenser 221 to improve mixing uniformity. The sealed bearing and flat key transmission are used to prevent adhesion and slippage, which ensures that the slush melt has a fine texture and meets user needs, thereby achieving broad application prospects.

Figure 7:
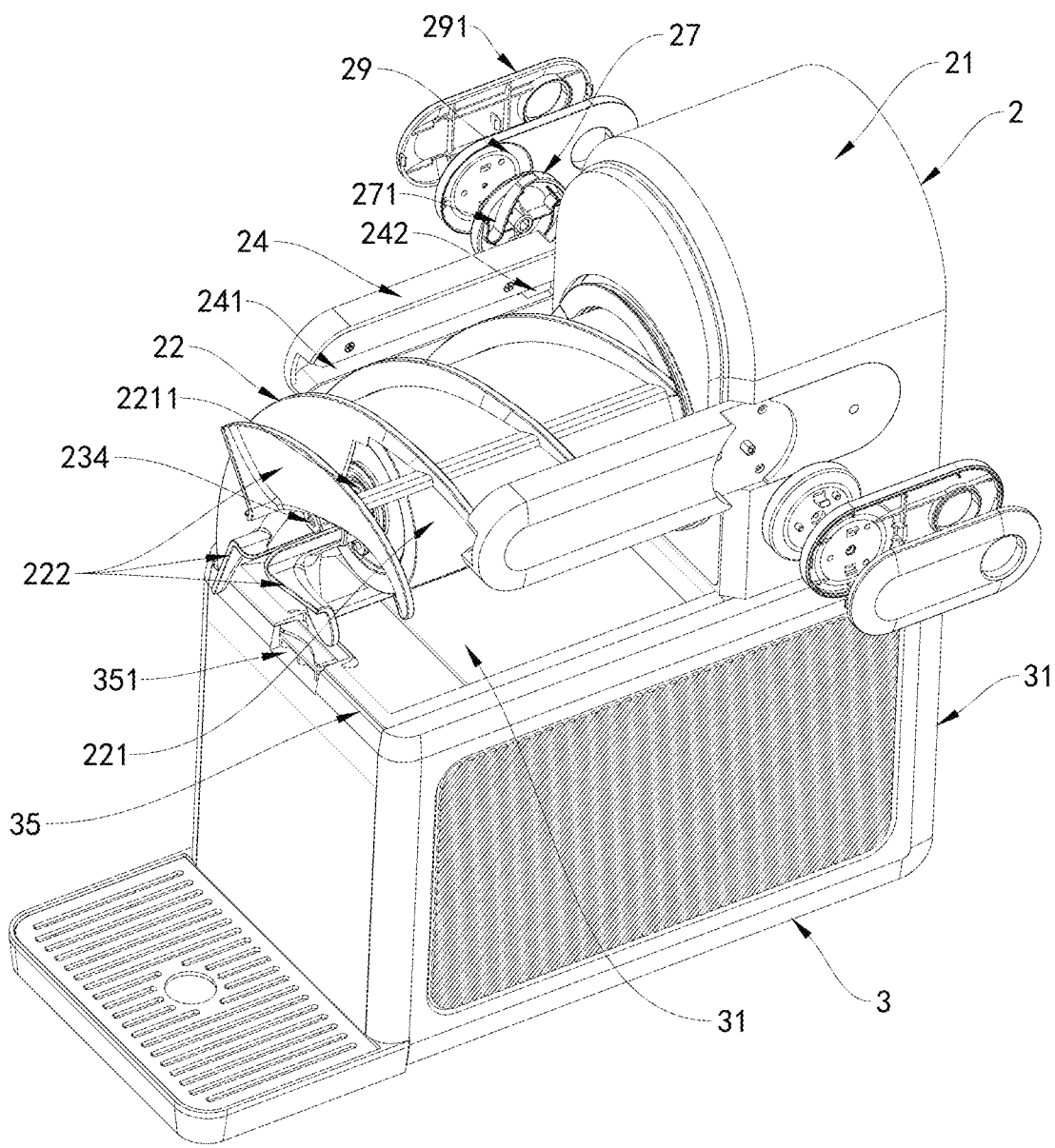
FIG. 7 is a schematic structural diagram of a lock buckle according to the present disclosure.
Figure 8:
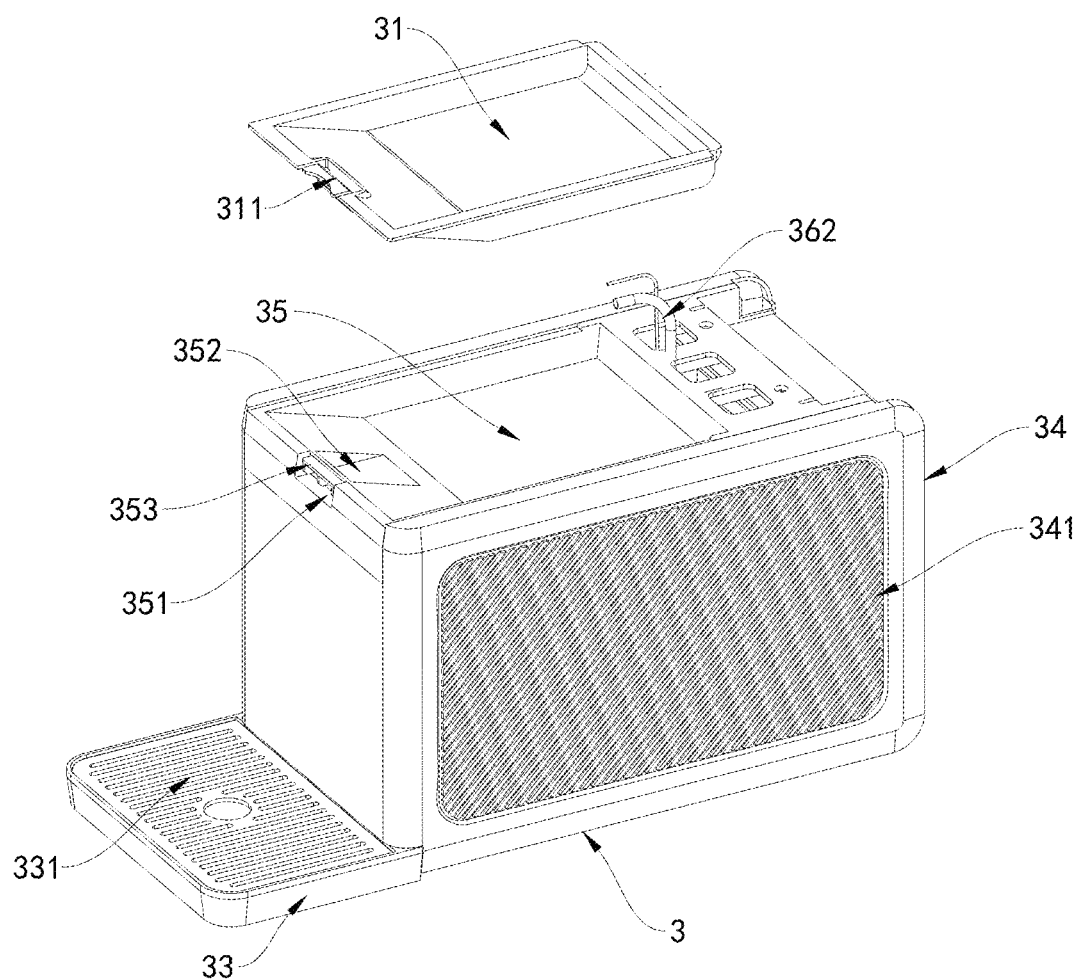
FIG. 8 is a schematic structural diagram of a middle frame according to the present disclosure.

As shown in FIG. 7, in some embodiments, the agitator 22 includes a condenser 221 and a three-blade propeller 222 sleeving outside the condenser 221. The driving mechanism 23 includes a driving motor 231 fixedly mounted inside the body upper shell 21 through a module bracket 211. One end of an output shaft 232 of the driving motor 231 penetrates through the condenser 221 and is connected and cooperated with one end of the three-blade propeller 222 through a flat key 233 and a keyway 234. One end of the condenser 221 is movably sleeved with the output shaft 232 through a sealed bearing 2211.

The flat key 233 is arranged at one end of a conveying shaft, and the keyway 234 is arranged inside one end of the three-blade propeller 222. The flat key 233 is inserted into the keyway 234 to achieve the transmission connection between the conveying shaft and the three-blade propeller 222. The three-blade propeller 222 improves the material mixing efficiency, avoids ice adhesion, and ensures the uniform texture of slush melt. The flat key 233 and the keyway 234 cooperate to ensure the reliability of power transmission, avoiding the three-blade propeller 222 and the output shaft 232 from slipping. The sealed bearing 2211 isolates the material from entering the interior of the condenser 221.

The driving motor 231 directly drives the three-blade propeller 222 to rotate through the output shaft 232 to stir materials inside the material tank 1. The condenser 221 serves as a static cold source to achieve direct heat exchange. The sealed bearing 2211 allows the output shaft 232 to rotate freely inside the condenser 221 while maintaining sealing.

Figure 3:
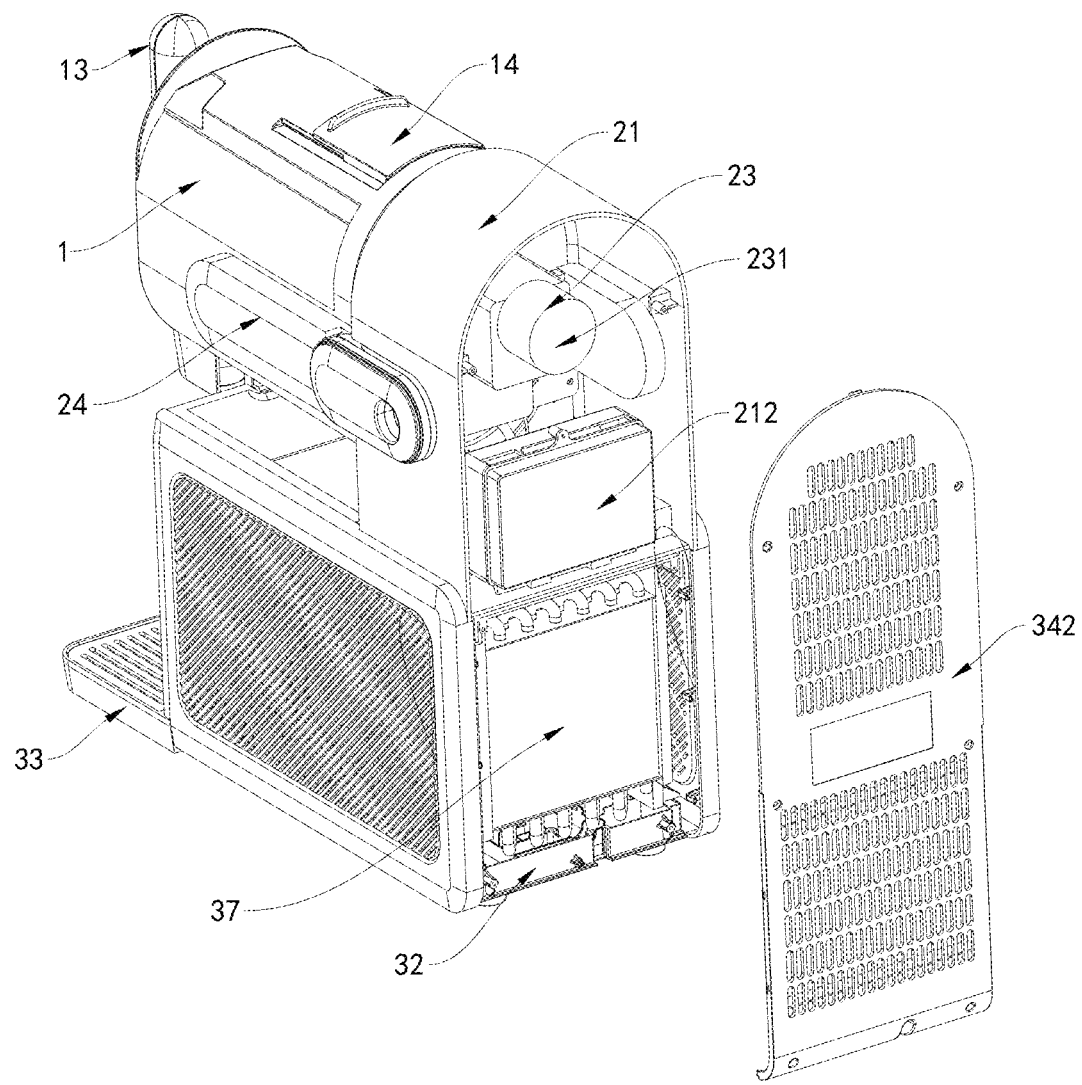
FIG. 3 is a schematic structural diagram of a power module according to the present disclosure.
Figure 4:
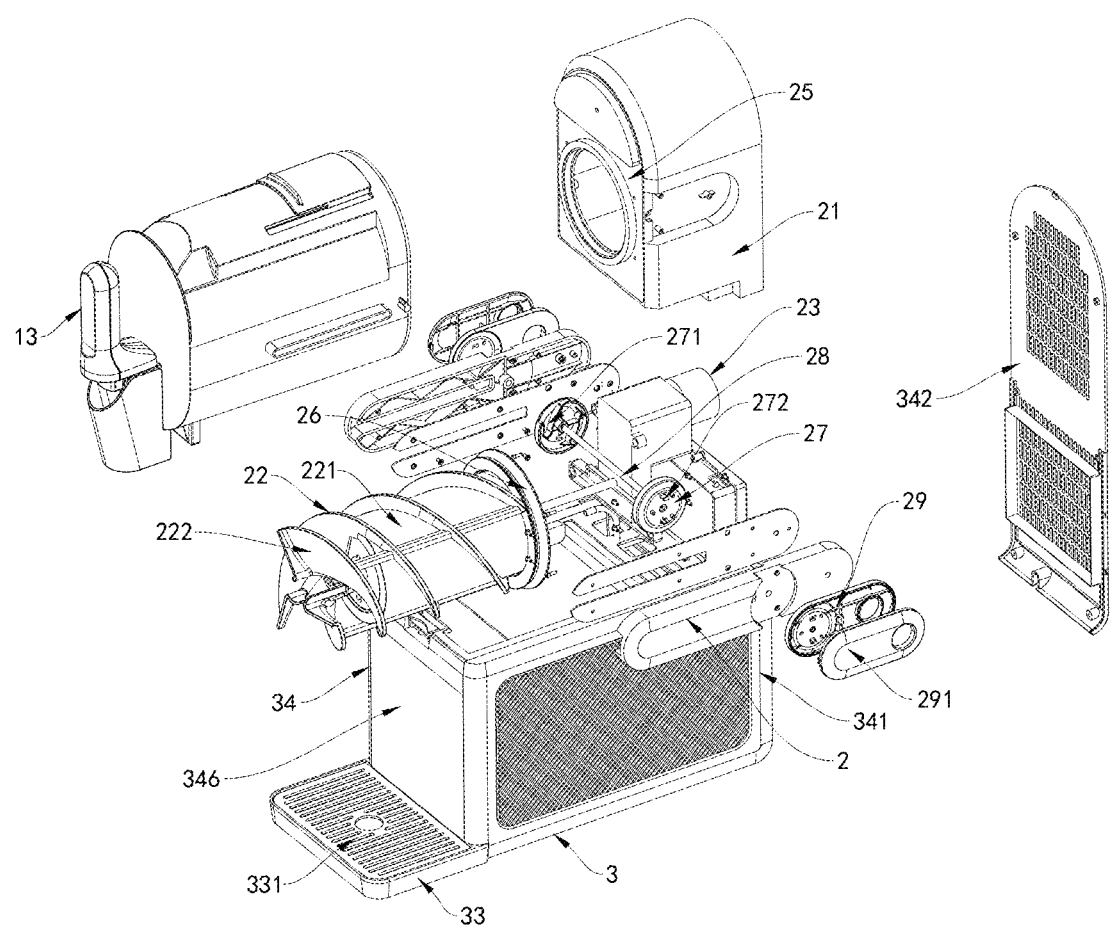
FIG. 4 is a schematic structural diagram of a rotating shaft according to the present disclosure.
Figure 10:
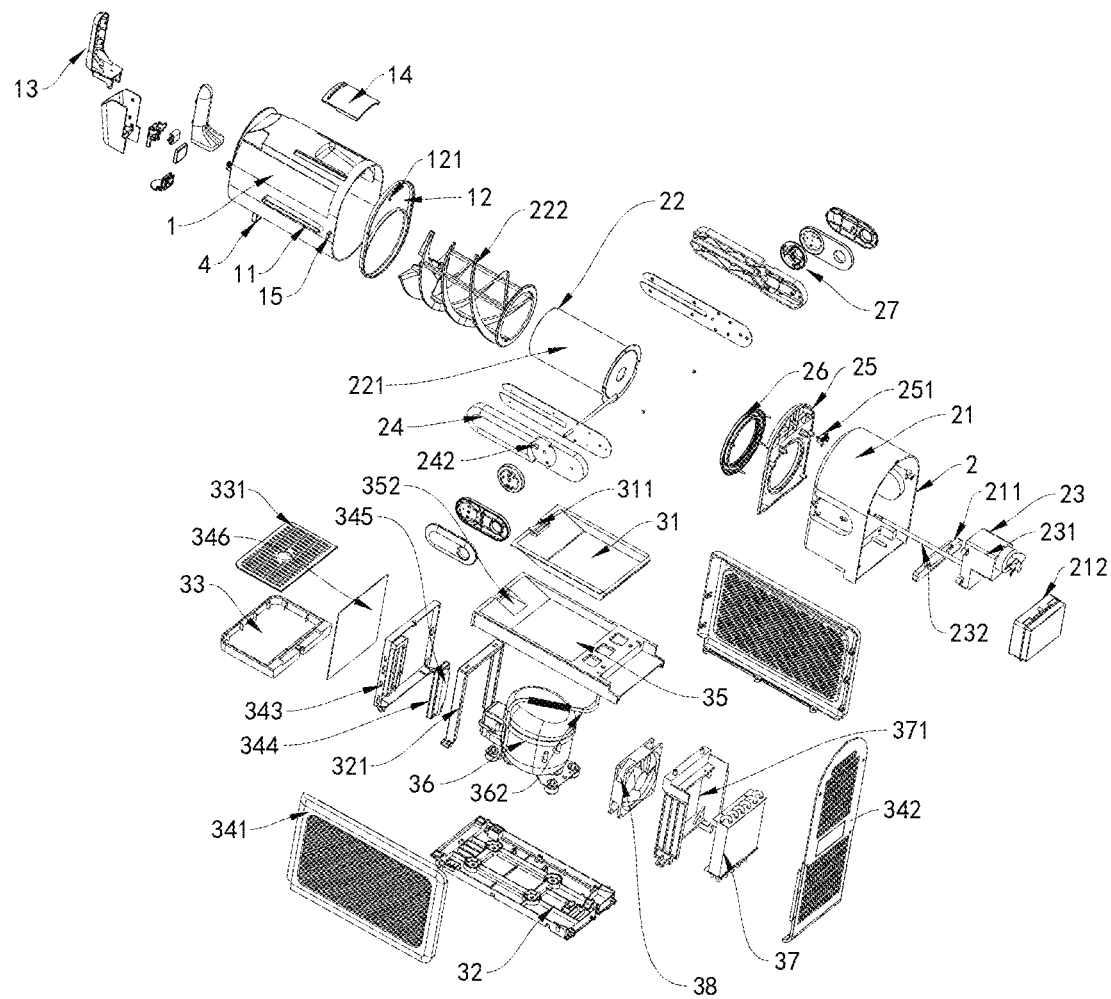
FIG. 10 is an exploded view of a refrigeration component according to the present disclosure.

As shown in FIG. 3 and FIG. 10, in some embodiments, the refrigeration component 3 includes a base 32 and a box body 34 disposed on a top of the base 32. A middle frame 35 is fixedly embedded on the top of the box body 34. One end of the middle frame 35 is provided with a support groove 351 and a clamping groove 352 located on one side of the support groove 351. The drip tray 31 is movably arranged inside the middle frame 35 and one end of the drip tray 31 is provided with an elastic buckle 311 clamped with the clamping groove 352.

The design of the elastic buckle 311 and the clamping groove 352 enables the drip tray 31 to be quickly disassembled and assembled with one hand, which is convenient for cleaning condensed water. The support groove 351 provides horizontal positioning to prevent the drip tray 31 from shifting and causing water leakage. During assembly, one end of the drip tray 31 is pushed in along the middle frame 35. After it is in place, the elastic buckle 311 at the other end is pressed down, and after being deformed under pressure, it is snapped into the clamping groove 352 and locked. During disassembly, the elastic buckle 311 is squeezed out of the clamping groove 352 to be lifted out. The support groove 351 limits the displacement of the drip tray 31, thereby ensuring the stability during use.

As shown in FIGS. 6-9, in some embodiments, a bottom end of the fixed bracket 4 is movably sleeved inside the support groove 351, and an interior of the support groove 351 is provided with a reinforcing rib 353 of which one end extends to an interior of the fixed bracket 4.

The reinforcing rib 353 is embedded into the fixed bracket 4, which significantly improves the support rigidity of the material tank 1 and avoids structural deformation caused by long-term load. The fixed bracket 4 disperses and transmits the operation pressure of the material tank 1 to the box body 34 of the refrigeration component 3. The fixed bracket 4 mainly shares the force applied to the material tank 1 by the user when using or moving the machine. The fixed bracket 4 mainly shares the force in two directions, the force of the user pressing down the discharge handle 13 during use, and the downward tension of the machine on the material tank 1 when moving the machine, which mainly strengthens the fixation of the material tank 1 with the support arms 24 and the lock buckles 27 on both sides to prevent damage caused by uneven force on the components.

The fixed bracket 4 moves horizontally with the material tank 1. When the material tank 1 is positioned at the working position, the fixed bracket 4 is pushed into the support groove 351. Meanwhile, the reinforcing rib 353 is inserted into the fixed bracket 4 to form a three-dimensional support frame, which disperses and transmits the operation pressure of the material tank 1 to the middle frame 35, the box body 34 and the base 32.

Figure 9:
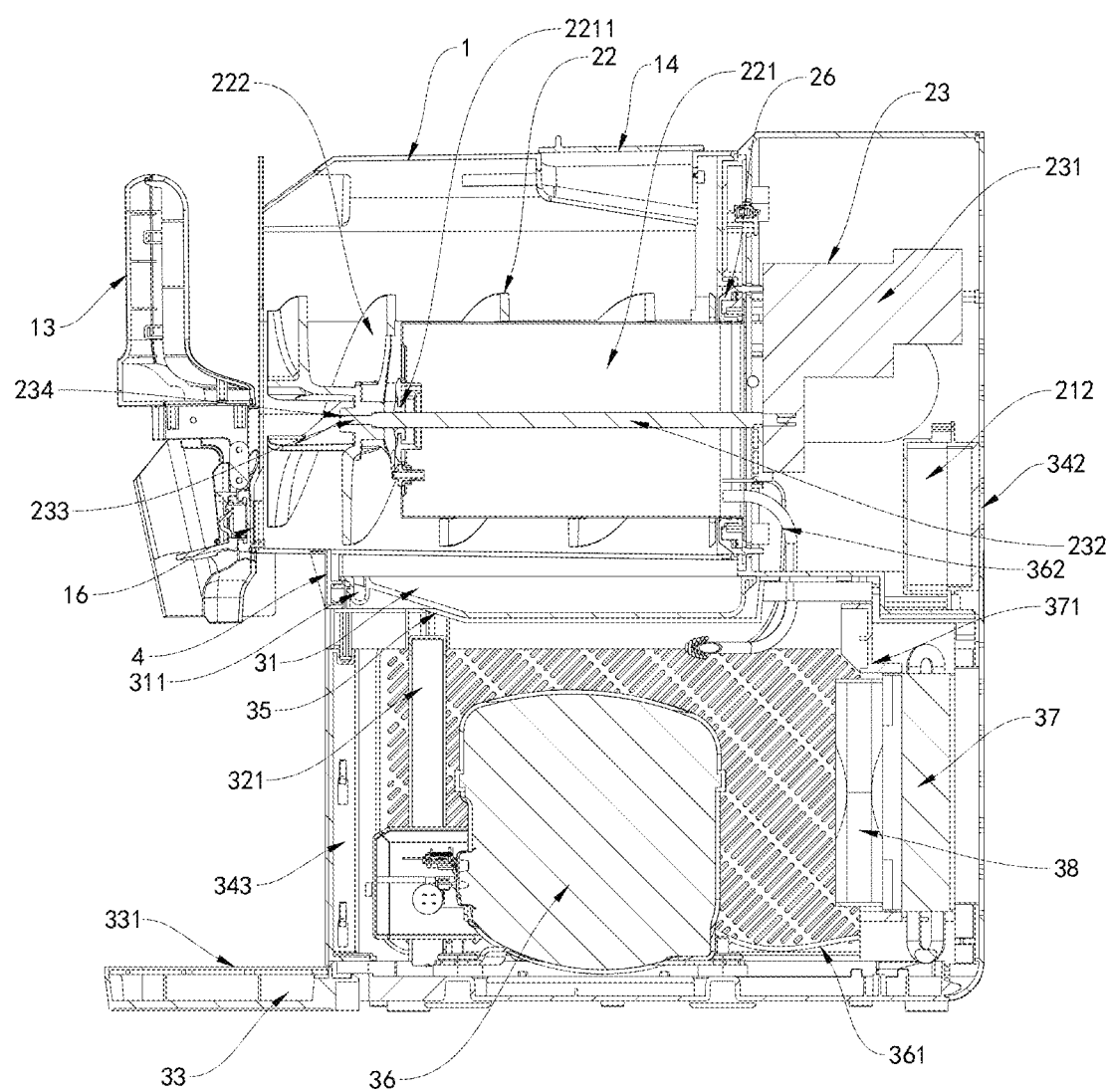
FIG. 9 is a cross-sectional view of a material tank according to the present disclosure.

As shown in FIGS. 9-10, in some embodiments, a compressor 36 and a heat exchanger 37 connected to the compressor 36 through a pipeline 361 are disposed on the top of the base 32. A liquid cooling delivery pipe 362 is disposed on the compressor 36, and one end of the liquid cooling delivery pipe 362 penetrates through the middle frame 35 and the body upper shell 21 and extends to an interior of the condenser 221. The heat exchanger 37 is mounted on the top of the base 32 through a rear bracket 371. A cooling fan 38 is disposed on one side of the rear bracket 371. A wastewater box lower cover 33 is movably disposed at one end of the base 32, and a wastewater box upper cover 331 is disposed on a top of the wastewater box lower cover 33.

The closed-loop pipeline 361 of the compressor 36, the heat exchanger 37, and the condenser 221 optimizes the heat transfer efficiency. The split wastewater box lower cover 33 and the wastewater box upper cover 331 are easy to clean. The cooling fan 38 actively discharges the heat of the heat exchanger 37. The rear bracket 371 centrally fixes the core components to improve the seismic stability.

The compressor 36 pressurizes a refrigerant and injects the refrigerant into the condenser 221 through the liquid cooling delivery pipe 362. The refrigerant that absorbs heat and vaporizes returns to the heat exchanger 37 and is forced to be cooled and liquefied by the cooling fan 38 to complete the cycle. The wastewater box upper cover 331 is mesh-shaped. After filtering wastewater, the wastewater enters the interior of the wastewater box lower cover 33. The wastewater box lower cover 33 is connected to the base 32 by active clamping connection, which is more convenient for disassembly, assembly and cleaning.

As shown in FIG. 10, in some embodiments, the box body 34 includes two base surface covers 341 arranged opposite to each other. A rear cover 342 and a front shell bracket 343 are respectively arranged between two ends of the two base surface covers 341. A display screen 344 and a control module 345 are disposed on one side of the front shell bracket 343, and a panel 346 is disposed on the other side of the front shell bracket 343. A front bracket 321 is disposed on the top of the base 32. Tops of the front bracket 321 and the rear bracket 371 are fixedly connected to a bottom of the middle frame (35). A top of the rear cover 342 extends to an interior of one side of the body upper shell 21.

The front bracket 321 and the rear bracket 371 support the middle frame 35 to form a bearing framework to improve the overall structural strength. The front shell integrates the control panel 346 and the display screen 344. The display screen 344 is a touch screen, making the human-computer interaction centralized. The panel 346 is made of a transparent material not affecting the display and touch operation of the display screen 344. The rear cover 342 extends to be embedded in the body upper shell 21 to simplify the appearance gap. The interior of the rear cover 342 is hollowed out for heat dissipation.

The base surface covers 341, the front shell bracket 343, and the rear cover 342 constitute the box body 34 fixed on the top of the base 32, and the control module 345 receives an instruction through the panel 346 and regulates the operation of the machine.

Figure 5:
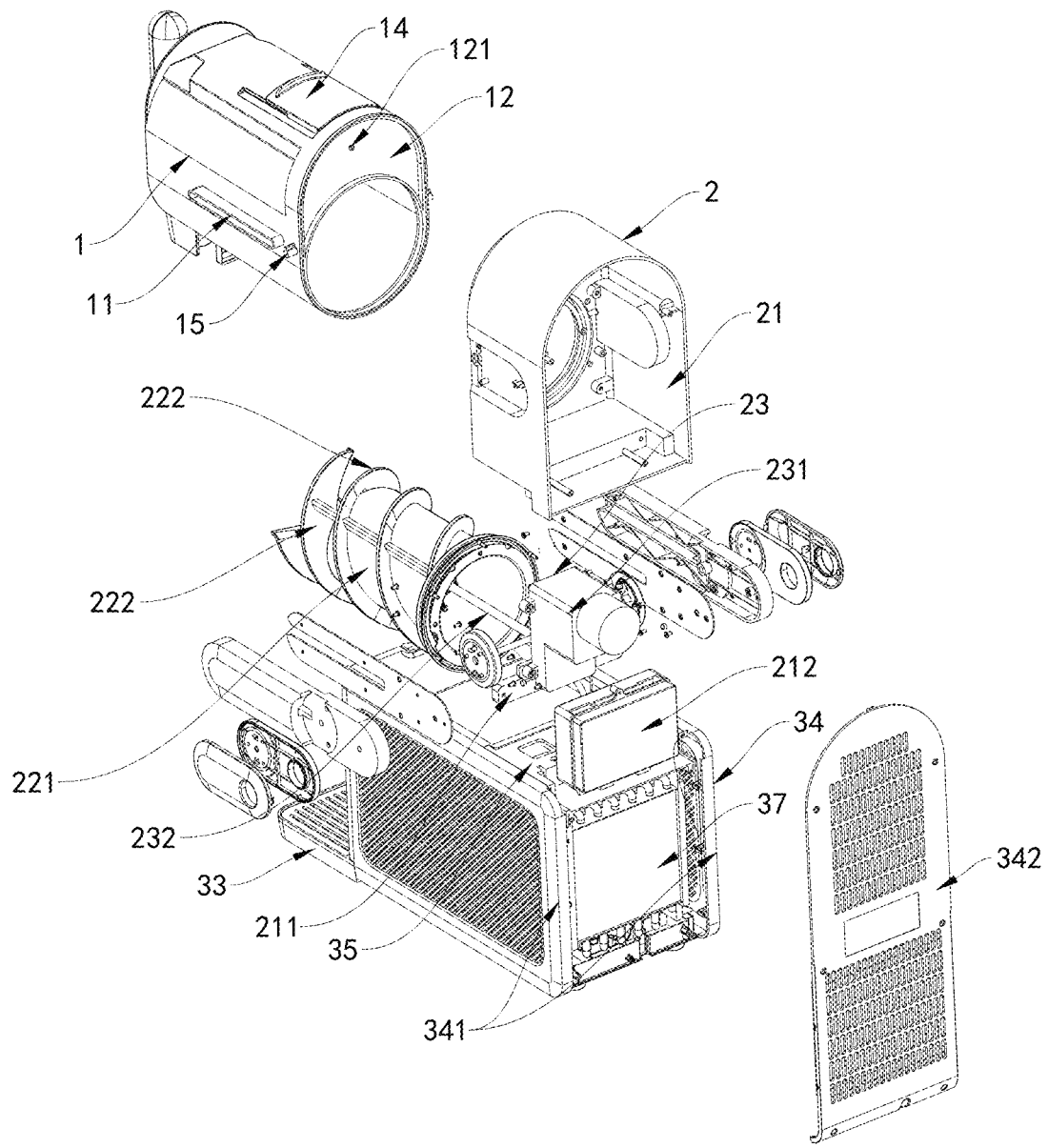
FIG. 5 is a schematic structural diagram of a material tank cover according to the present disclosure.
Figure 6:
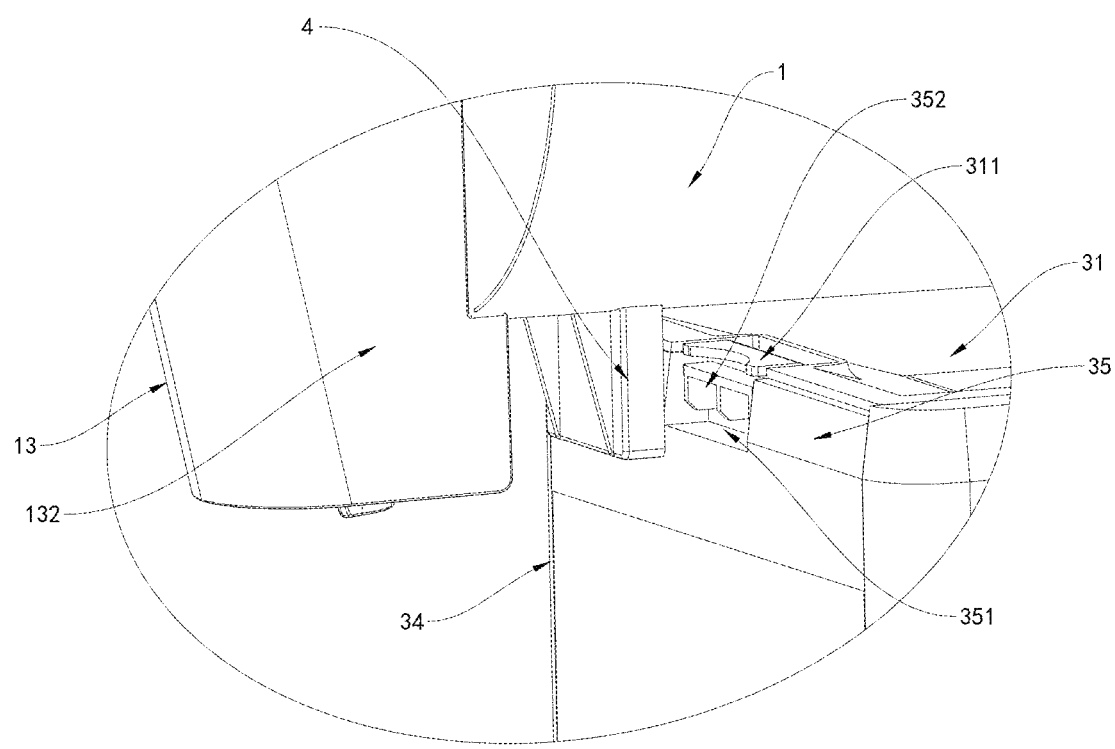
FIG. 6 is a schematic structural diagram of a fixed bracket according to the present disclosure.

As shown in FIG. 3, FIG. 5 and FIG. 10, in some embodiments, a material tank cover 12 is disposed at one end of the material tank 1, and a discharge handle 13 is disposed at the other end of the material tank 1. A feed cover 14 is disposed on a top of the material tank 1. An induction column 121 is disposed on one side of the material tank cover (12). A surface cover (25) is disposed on one side of the body upper shell (21). An infrared probe (251) corresponding to the induction column 121 is disposed on the surface cover 25. A material tank sealing ring 26 is disposed on one side of the surface cover (25). An end of the condenser 221 away from the sealed bearing 2211 penetrates through the material tank sealing ring 26 to be fixed to the surface cover 25, and the material tank cover 12 presses the material tank sealing ring 26 after the material tank 1 is mounted in place.

When assembling the material tank 1, the material tank 1 slides inside the track 241 through the bracket to achieve smooth movement, and the positioning channel 271 on one side of the lock buckle 27 docks with the positioning pin 15, so that the lock buckle 27 drives the lock buckle handle outer shell 291 and one end of the lock buckle handle inner shell 29 to be in a tilted state. When the material tank 1 moves to the working position to completely cover the agitator 22, the positioning pin 15 is opposite to the opening of the positioning channel 271 on one side of the lock buckle 27. The user flips down the lock buckle handle outer shell 291 and one end of the lock buckle handle inner shell 29 away from the lock buckle 27 to drive the lock buckle 27 to rotate. During the rotation of the lock buckle 27, the positioning channel 271 swallows the positioning pin 15, and the lock buckle handle outer shell 291 and the lock buckle handle inner shell 29 are also flipped from the original tilted state to a state flush with the support arms 24. When the positioning pin 15 is locked, an induction part on one side of the material tank cover 12 contacts the infrared probe 251, and the infrared probe 251 triggers a feedback to the control module 345 that the material tank 1 is mounted and positioned at the working position. Meanwhile, the material tank cover 12 presses the material tank sealing ring 26 to maintain the sealing inside the material tank 1. After the assembly is completed, the feed cover 14 is opened to pour the raw materials into the material tank 1, and the operation can begin.

As shown in FIGS. 2-5, in some embodiments, the support bracket 11 is in a "straight line shape". The positioning pins 15 are disposed on two sides of the material tank 1. The lock buckle 27 is movably disposed on one side of the support arm 24. The positioning channel 271 is disposed on one side of the lock buckle 27. A notch 242 configured to connect the positioning channel 271 and the positioning pin 15 is disposed at one end of the track 241. The lock buckles 27 on the two support arms 24 rotate synchronously through a rotating shaft 28.

The track 241 slidably cooperates with the positioning pin 15 and the support bracket 11 to achieve precise guiding of the material tank 1, and the support bracket 11 of the "straight line shape" has a large contact area with the track 241, so that the material tank 1 in a suspended bottom state maintains good stability during and after assembly, the overall force is more uniform, and assembly is more labor-saving. The setting of the double lock buckles 27 further ensures the assembly stability of the material tank 1, and makes the force of the material tank 1 pressing the material tank sealing ring 26 more uniform, further improving the sealing performance. The double lock buckles 27 rotate synchronously through the rotating shaft 28, so that the user only needs to operate the lock buckle handle outer shell 291 on one side of the body upper shell 21.

As shown in FIGS. 2-5, in some embodiments, the side of the lock buckle 27 away from the positioning channel 271 is clamped with the lock buckle handle inner shell 29 through a buckle 272, and the lock buckle handle outer shell 291 is provided on one side of the lock buckle handle inner shell 29. A power module 212 is also provided inside the body upper shell 21.

The lock buckle handle inner shell 29 and the lock buckle handle outer shell 291 are configured to drive the lock buckle 27 to rotate. Meanwhile, after the lock buckle 27 limits the positioning pin 15, the lock buckle handle outer shell 291 and the lock buckle handle inner shell 29 remain flush with the support arm 24, thereby improving the overall appearance of the product and improving the grip comfort and durability.

The power module 212 is built-in to shorten a cable path and reduce the risk of interference. The power module 212 is fixed inside the body upper shell 21 and directly supplies power to electrical components such as the driving mechanism 23 and the control module 345, the display screen 344, the compressor 36, the fan, and the infrared probe 251.

Figure 11:
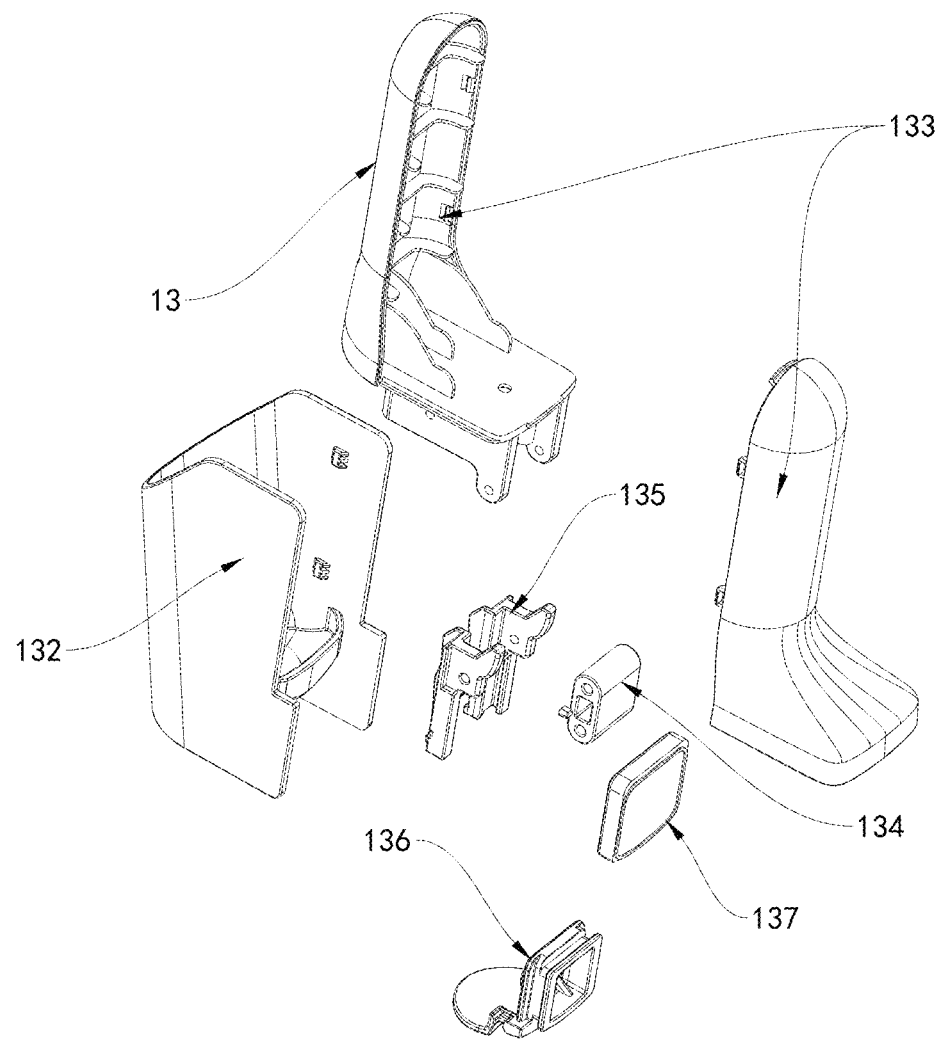
FIG. 11 is an exploded view of a discharge handle according to the present disclosure.

As shown in FIG. 11, in some embodiments, the discharge handle 13 includes a support 131 fixedly arranged at one end of the material tank 1 and a discharge trough 132 movably connected to an exterior of the support 131. The discharge trough 132 is vertically opposite to the wastewater box upper cover 331. A handle 133 is rotatably disposed inside the support 131. A connecting rod 134 is hinged at a bottom end of the handle 133. A discharge trough support bracket 135 is hinged at a bottom of the connecting rod 134. A discharge cover 136 is movably disposed at a bottom of the discharge trough support bracket 135. A sealing ring 137 sleeves one side of the discharge cover 136. A discharge port 16 fit with the sealing ring 137 is disposed on one side of the material tank 1.

The setting of the sealing ring 137 guarantees the sealing of the discharge port 16 and prevents leakage. An inner cavity at the bottom of the discharge trough 132 is circular, making discharging more uniform.

During discharging, a container is placed on the wastewater box cover 331 and aligned with the discharge trough 132, the handle 133 is pulled down, the handle 133 flips and pulls the connecting rod 134, the connecting rod 134 pulls the discharge trough bracket 135, the discharge trough bracket 135 drives the discharge cover 136 to rise, and the discharge cover 136 drives the sealing ring 137 to be away from the obstruction of the discharge port 16, and then discharging can be carried out.

During use, the user pushes the support brackets 11 on both sides of the material tank 1 to slide along the transverse rails 241 in the support arms 24 of the body upper shell 21 to position the material tank 1 to the working position. After the material tank 1 is in place, the lock buckle 27 is pressed down to rotate it, and the positioning channel 271 of the lock buckle 27 swallows the positioning pin 15 on the support arm 24 to lock the material tank 1. In this case, the induction column 121 of the material tank cover 12 triggers the infrared probe 251 to confirm the positioning, and presses the material tank sealing ring 26 to ensure the sealing. The fixed bracket 4 at the bottom of the material tank 1 is embedded in the support groove 351 on the top of the refrigeration component 3 with the movement, and the internal reinforcing rib 353 is inserted into the bracket to form a three-dimensional support frame, which disperses and transmits the operation of the user such as pressing the handle for discharging or the tension of carrying to the box body 34.

The driving motor 231 drives the three-blade propeller 222 to rotate and stir the materials inside the material tank 1 through the output shaft 232. The sealed bearing 2211 isolates the materials from entering the condenser 221. The flat key 233 and the keyway 234 guarantee reliable power transmission to avoid slipping. The compressor 36 pressurizes the refrigerant and injects the refrigerant into the condenser 221 through the liquid cooling delivery pipe 362 to absorb heat. The vaporized refrigerant flows back to the heat exchanger 37 in the box body 34, and is forced to cool and liquefy by the cooling fan 38 to complete the cycle. The condensed water is collected by the drip tray 31 located below the material tank 1 for easy disassembly and cleaning. During discharging, the handle 133 is pressed down to lift the discharge cover 136 with the sealing ring 137 to open the discharge port 16. The slush melt falls into the container through the discharge trough 132, and the wastewater is filtered by the mesh wastewater box upper cover 331 and then enters the detachable wastewater box lower cover 33.

To sum up, the present disclosure achieves sliding positioning and precise locking of the material tank 1 using the structure of double support arms 24, tracks 241 and lock buckles 27, which improves the assembly accuracy and operation stability. The fixed bracket 4 at the bottom of the material tank 1 is embedded in the support groove 351 of the refrigeration component 3 to form a three-dimensional frame, which disperses and transmits the discharge pressure and handling tension to the box body 34 to prevent component deformation, protect the connection structure of the material tank 1, and prevent stress deformation. The elastic buckle 311 drip tray 31 has a one-hand quick-release design that simplifies the cleaning process. The three-blade propeller 222 is directly connected to the condenser 221 to improve mixing uniformity. The sealed bearing and flat key transmission are used to prevent adhesion and slippage, which ensures that the slush melt has a fine texture and meets user needs, thereby achieving broad application prospects.

Finally, it should be noted that the above description is only a preferred embodiment of the present disclosure and is not intended to limit the present disclosure. Although the present disclosure has been described in detail with reference to the embodiments, those skilled in the art can still modify the technical solutions described in the embodiments or replace some of the technical features therein by equivalents. Any modification, equivalent replacement, improvement, etc. made within the spirit and principle of the present disclosure shall be included in the protection scope of the present disclosure.

The invention claimed is:

1. A slush machine, comprising:
a material tank (1) including two support brackets (11) on two sides, respectively;
an agitator component (2) including a body upper shell (21) having one side provided with an agitator (22) having one end extending into the material tank (1), and a driving mechanism (23) for driving the agitator (22);
two support arms (24) corresponding to the support brackets (11) disposed on two sides of the body upper shell (21), respectively;
a track (241) formed in each of the support arms (24) wherein the support bracket (11) is configured to slide along the track (241) to position the material tank (1) to a working position;
a refrigeration component (3) having a top detachably connected to a drip tray (31) located below the material tank (1) wherein the body upper shell (21) is fixedly disposed on a top of the refrigeration component (3);
positioning pins (15) disposed on two sides of the material tank (1), respectively;
a lock buckle (27) movably disposed on one side of each of the support arms (24) and configured to rotate synchronously through a rotating shaft (28);
a positioning channel (271) disposed on one side of the lock buckle (27);
a notch (242) configured to connect to both the positioning channel (271) and the positioning pin (15) and disposed at one end of the track (241); and
a fixed bracket (4) disposed at a bottom of one end of the material tank (1);
wherein a bottom of the fixed bracket (4) contacts the top of the refrigeration component (3) and is configured to transmit an operation load to the refrigeration component (3);
wherein a bottom end of the fixed bracket (4) is movably sleeved in a support groove (351); and
wherein inside of the support groove (351) is provided with a reinforcing rib (353).

2. The slush machine of claim 1, wherein one side of the lock buckle (27) away from the positioning channel (271) is clamped with a lock buckle handle inner shell (29) through a buckle (272), further comprising a lock buckle handle outer shell (291) disposed on one side of the lock buckle handle inner shell (29), and a power module (212) disposed inside the body upper shell (21).

* * * * *